(12) United States Patent
Park

(10) Patent No.: US 9,723,185 B2
(45) Date of Patent: *Aug. 1, 2017

(54) CAMERA MODULE HAVING MECHANICAL IMAGE STABILIZATION MECHANISM

(71) Applicant: LG Innotek Co., Ltd., Seoul (KR)

(72) Inventor: Sangok Park, Seoul (KR)

(73) Assignee: LG INNOTEK CO., LTD., Seoul (KR)

( * ) Notice: Subject to any disclaimer, the term of this patent is extended or adjusted under 35 U.S.C. 154(b) by 0 days.

This patent is subject to a terminal disclaimer.

(21) Appl. No.: 15/009,381

(22) Filed: Jan. 28, 2016

(65) Prior Publication Data

US 2016/0150137 A1 May 26, 2016

Related U.S. Application Data

(63) Continuation of application No. 14/072,475, filed on Nov. 5, 2013, now Pat. No. 9,282,247, which is a (Continued)

(30) Foreign Application Priority Data

Dec. 14, 2010 (KR) ........................ 10-2010-0127511

(51) Int. Cl.
  *H04N 5/225* (2006.01)
  *H04N 5/232* (2006.01)
  (Continued)

(52) U.S. Cl.
  CPC ............. *H04N 5/2253* (2013.01); *G02B 7/08* (2013.01); *G02B 27/646* (2013.01);
  (Continued)

(58) Field of Classification Search
  None
  See application file for complete search history.

(56) References Cited

U.S. PATENT DOCUMENTS

2009/0252489 A1 10/2009 Huang et al.
2010/0149666 A1 6/2010 Liao
(Continued)

FOREIGN PATENT DOCUMENTS

JP 2013024938 A 2/2013
JP 2013024944 A 2/2013
(Continued)

OTHER PUBLICATIONS

Office Action dated Nov. 24, 2014 in U.S. Appl. No. 14/072,475.
Office Action dated Aug. 4, 2014 in U.S. Appl. No. 14/072,475.
Office Action dated Jan. 10, 2014 in U.S. Appl. No. 14/072,475.

*Primary Examiner* — Shahbaz Nazrul
(74) *Attorney, Agent, or Firm* — Saliwanchik, Lloyd & Eisenschenk

(57) ABSTRACT

The present disclosure relates to a camera module including a fixture; a moving part centrally coupled with a lens and arranged to move relative to the fixture; three or more magnets arranged at a periphery of the moving part; and three or more coils arranged from an inner surface of the fixture to areas opposite to the three or more magnets, where each of the coils independently receives a control signal so that the moving part moves to a height direction and tilted relative to a central axis of the moving part, whereby a lens can be axially moved and tilted at the same time using arrangement of a single set of coils and magnets.

20 Claims, 4 Drawing Sheets

Related U.S. Application Data continuation of application No. 13/325,928, filed on Dec. 14, 2011, now Pat. No. 8,605,213.

(51) Int. Cl.
  G02B 7/08 (2006.01)
  G02B 27/64 (2006.01)
  H02K 41/035 (2006.01)

(52) U.S. Cl.
  CPC ....... H02K 41/0356 (2013.01); H04N 5/2254 (2013.01); H04N 5/2257 (2013.01); H04N 5/23212 (2013.01); H04N 5/23264 (2013.01); H02K 2201/18 (2013.01)

(56) References Cited

U.S. PATENT DOCUMENTS

| | | |
|---|---|---|
| 2010/0316363 A1 | 12/2010 | Chou |
| 2010/0329654 A1 | 12/2010 | Chiang |
| 2011/0013895 A1 | 1/2011 | Chiang |
| 2011/0122267 A1 | 5/2011 | Ahn et al. |
| 2011/0176046 A1* | 7/2011 | Hu .................... G02B 7/08 348/335 |
| 2011/0235196 A1 | 9/2011 | Ke |
| 2012/0154614 A1 | 6/2012 | Moriya et al. |
| 2012/0162790 A1 | 6/2012 | Chiang |
| 2012/0229901 A1 | 9/2012 | Moriya et al. |
| 2013/0016427 A1 | 1/2013 | Sugawara |
| 2013/0016428 A1 | 1/2013 | Sugawara et al. |
| 2013/0050828 A1 | 2/2013 | Sato et al. |

FOREIGN PATENT DOCUMENTS

| | | |
|---|---|---|
| JP | 2013044924 A | 3/2013 |
| JP | 5348235 B2 | 8/2013 |
| JP | 2013210550 A | 10/2013 |

* cited by examiner

CAMERA MODULE HAVING MECHANICAL IMAGE STABILIZATION MECHANISM

CROSS-REFERENCE TO RELATED APPLICATIONS

This application is a continuation of U.S. application Ser. No. 14/072,475, filed Nov. 5, 2013; which is a continuation of U.S. application Ser. No. 13/325,928, filed Dec. 14, 2011, now U.S. Pat. No. 8,605,213, issued Dec. 10, 2013; which claims the benefit under 35 U.S.C. §119 of Korean Patent Application No. 10-2010-0127511, filed Dec. 14, 2010, which are hereby incorporated by reference in their entirety.

BACKGROUND OF THE DISCLOSURE

Field of the Disclosure

The teachings in accordance with the exemplary embodiments of this present disclosure generally relate to a camera module, and more particularly to a camera module equipped with an optical image stabilizing function capable of providing an auto-focusing function and a shake compensating function as well.

Description of Related Art

Generally, a digital camera module, instead of a photosensitive film, uses an image sensor such as a CCD (Charge Coupled Device) or a CMOS (Complementary Metal Oxide Semiconductor) to photograph a digital image or a moving picture.

A camera module with an image sensor is used on wide fields such as a mobile device capable of photographing a photograph, a monitoring camera and a surveillance camera mounted on a vehicle due to advantages of less volume and excellent physical performance. Particularly, the trend is that a camera module used for a mobile device is gradually miniaturized, multi-functional and light-weighted.

Recently, a camera module used for a mobile device is basically mounted with an auto focusing function or an optical image stabilizing function. Meantime, devices forming a camera module must cater to demands for miniaturization in response to miniaturization of lenses and improvement of optical performances.

A driving apparatus such as a voice coil motor is used to accomplish the auto focusing function, where the voice coil motor performs the auto focusing function by vertically moving a lens or a sensor in a predetermined space. Furthermore, a device is mounted to vibrate or move the lens or the sensor in a predetermined direction to stabilize an optical image, where a device such as a step motor or a voice coil motor is additionally arranged.

However, mounting of additional driving elements for compensating the vibration or movement or inhibiting shaking may disadvantageously increase volume of the camera module, complicate a manufacturing process and reduce a manufacturing efficiency.

BRIEF SUMMARY

The present disclosure has been made to solve the foregoing problems of the prior art and therefore an object of certain embodiments of the present disclosure is to provide a camera module configured with a driving unit comprised of one set to simultaneously perform an auto focusing function and a stabilization function.

Technical subjects to be solved by the present disclosure are not restricted to the above-mentioned description, and any other technical problems not mentioned so far will be clearly appreciated from the following description by the skilled in the art. That is, the present disclosure will be understood more easily and other objects, characteristics, details and advantages thereof will become more apparent in the course of the following explanatory description, which is given, without intending to imply any limitation of the disclosure, with reference to the attached drawings.

Therefore, an object of the present disclosure is to solve at least one or more of the above problems and/or disadvantages in whole or in part and to provide at least advantages described hereinafter. In order to achieve at least the above objects, in whole or in part, and in accordance with the purposes of the invention, as embodied and broadly described, and in one general aspect of the present invention, there is provided a camera module, the camera module comprising: a fixture for being coupled with an image sensor; a moving part centrally coupled with a lens and arranged to move relative to the fixture; a plurality of magnets arranged at a periphery of the moving part; and coils arranged at the fixture and positioned at areas opposite to the plurality of magnets.

Preferably, the coil includes first and third coils arranged on a y axis, and second and fourth coils arranged on an x axis.

Preferably, each of the coils takes a shape of a track, and is lengthily and horizontally formed inside the fixture.

Preferably, each of the magnets is formed with an opposite polarity at an upper surface and a bottom surface.

Preferably, the camera module further comprises a spring including an upper spring supporting an upper distal end of the moving part, and a bottom spring supporting a bottom distal end of the moving part.

Preferably, each of the upper and bottom distal ends is formed with a single-plated elastic material, and independently operates to the x and y axes relative to the moving part to provide a mutually identical elasticity.

Preferably, the fixture includes a housing supporting the coils and accommodating the moving part at an inner space, and a base coupled with an image sensor and a PCB (Printed Circuit Board) and coupled to a bottom surface of the housing, where the housing includes terminal units connected from an area arranged with the coils to the PCB.

Preferably, each terminal unit is integrally formed with the housing by an insert injection molding method.

Preferably, the housing further includes a groove-shaped connector arranged with a tail of the coil, where an inner space of the connector is exposed with a part of the terminal unit to be connected to the tail of the coil.

Preferably, the base includes a hole-shaped terminal insertion hole through which the terminal unit passes.

Preferably, a bottom distal end of the moving part is discretely arranged from a bottom surface of the fixture at a base position where a control signal is not inputted to the coil.

Preferably, a height-directed center of the magnet is situated at a position lower than that of a height-directed center of the coil.

Preferably, the fixture further includes a buffer member so arranged as to be situated adjacent to a bottom distal end side of the moving part.

Preferably, the fixture opposite to each of the magnet is formed with a through hole receiving the coil.

Preferably, the camera module includes at least three or more magnets and coils.

In another general aspect of the present invention, there is provided a camera module including a PCB (Printed Circuit Board), an image sensor and a lens, the camera module comprising: a fixture including a housing having a receiving space; a moving part arranged inside the housing, coupled with a lens thereinside and moving relative to the housing; a plurality of coils coupled to the housing, each spaced apart at an equal distance; and a plurality of magnets coupled to a periphery of the moving part to face each of the coils, wherein each coil is individually applied with a driving signal from the PCB so that the moving part moves to a height direction to be tilted relative to a central axis of the moving part.

Preferably, the camera module further comprises: an upper spring elastically supporting an upper distal end of the moving part relative to the housing; a bottom spring elastically supporting a bottom distal end of the moving part relative to the housing, wherein each of the upper and bottom springs independently provides elasticity to the moving part from four areas of length and breadth directions.

Preferably, each of the upper and bottom springs takes a single-plated shape.

Preferably, a bottom distal end of the moving part is discretely arranged from a bottom surface of the fixture at a base position where the driving signal is not inputted to the coil.

Preferably, the fixture includes a base coupled with the image sensor and the PCB (Printed Circuit Board) and coupled to a bottom surface of the housing, where the housing includes terminal units connected from an area arranged with the coils to the PCB.

The camera module according to the present disclosure has an advantageous effect in that the camera module includes a fixture; a moving part centrally coupled with a lens and arranged to move relative to the fixture; three or more magnets arranged at a periphery of the moving part; and three or more coils arranged from an inner surface of the fixture to areas opposite to the three or more magnets, where each of the coils independently receives a control signal so that the moving part moves to a height direction and tilted relative to a central axis of the moving part, whereby a lens can be axially moved and tilted at the same time using arrangement of a single set of coils and magnets.

BRIEF DESCRIPTION OF THE DRAWINGS

The accompanying drawings, which are included to provide a further understanding of the disclosure and are incorporated in and constitute a part of this application, illustrate embodiment(s) of the disclosure and together with the description serve to explain the principle of the disclosure. In the drawings.

DETAILED DESCRIPTION

Figure 1:
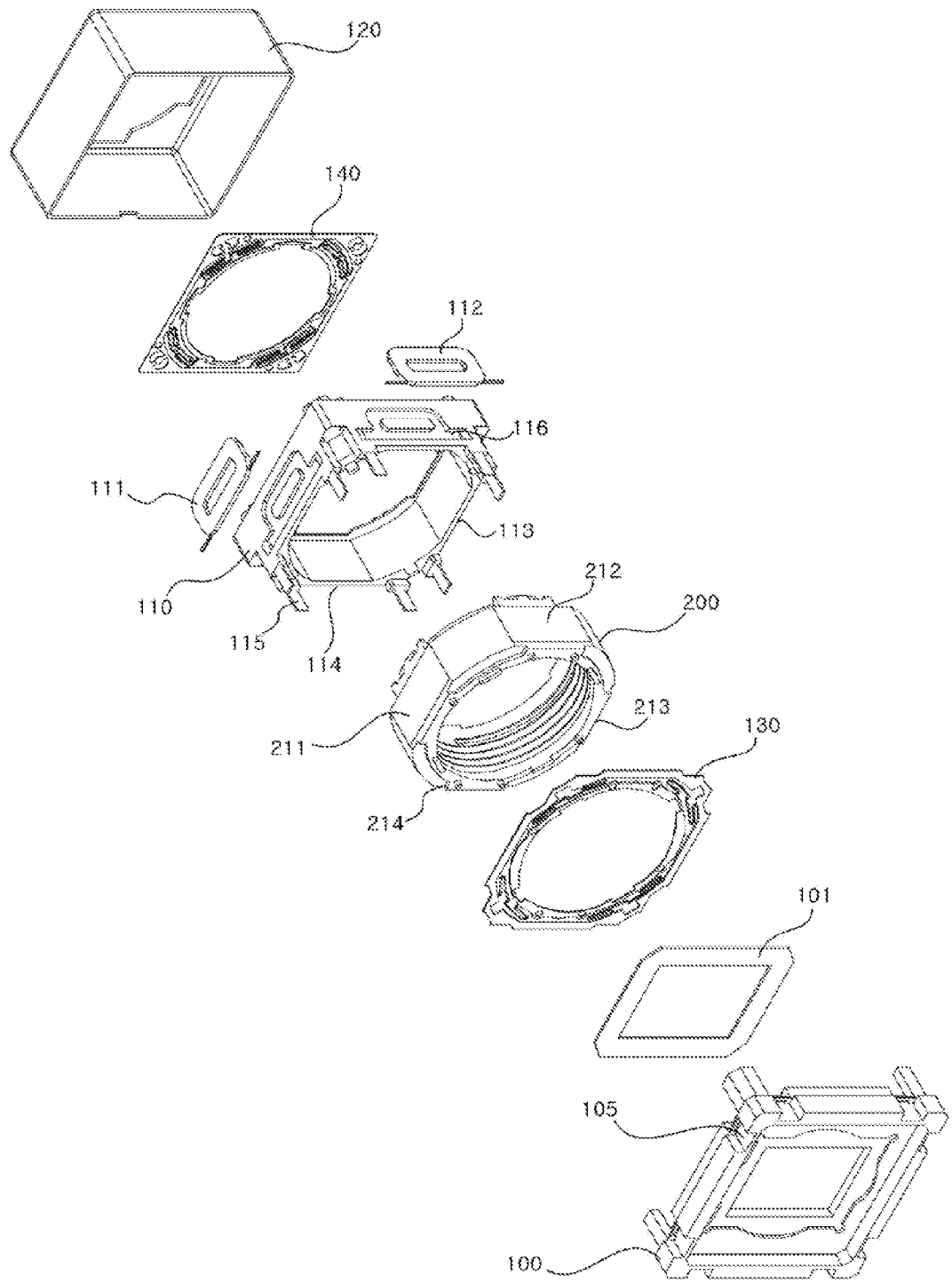
FIG. 1 is an exploded perspective view illustrating a camera module according to an exemplary embodiment of the present disclosure.

Various exemplary embodiments will be described more fully hereinafter with reference to the accompanying drawings, in which some exemplary embodiments are shown. The present inventive concept may, however, be embodied in many different forms and should not be construed as limited to the example embodiments set forth herein. Rather, these exemplary embodiments are provided so that this description will be thorough and complete, and will fully convey the scope of the present inventive concept to those skilled in the art.

It will be understood that when an element or layer is referred to as being "on," "connected to" or "coupled to" another element or layer, it can be directly on, connected or coupled to the other element or layer or intervening elements or layers may be present. In contrast, when an element is referred to as being "directly on," "directly connected to" or "directly coupled to" another element or layer, there are no intervening elements or layers present. Like numerals refer to like elements throughout.

It will be understood that, although the terms first, second, third, etc. may be used herein to describe various elements, components, regions, layers and/or sections, these elements, components, regions, layers and/or sections should not be limited by these terms. These terms are only used to distinguish one element, component, region, layer or section from another region, layer or section. Thus, a first element, component, region, layer or section discussed below could be termed a second element, component, region, layer or section without departing from the teachings of the present inventive concept.

As used herein, the singular forms "a," "an" and "the" are intended to include the plural forms as well, unless the context clearly indicates otherwise. It will be further understood that the terms "comprises" and/or "comprising," and "includes" and/or "including" when used in this specification, specify the presence of stated features, integers, steps, operations, elements, and/or components, but do not preclude the presence or addition of one or more other features, integers, steps, operations, elements, components, and/or groups thereof.

As may be used herein, the terms "substantially" and "approximately" provide an industry-accepted tolerance for its corresponding term and/or relativity between items. Such an industry-accepted tolerance ranges from less than one percent to ten percent and corresponds to, but is not limited to, component values, angles, et cetera.

Unless otherwise defined, all terms (including technical and scientific terms) used herein have the same meaning as commonly understood by one of ordinary skill in the art to which this inventive concept belongs. It will be further understood that terms, such as those defined in commonly used dictionaries, should be interpreted as having a meaning that is consistent with their meaning in the context of the relevant art and will not be interpreted in an idealized or overly formal sense unless expressly so defined herein.

Descriptions of well-known components and processing techniques are omitted so as not to unnecessarily obscure the embodiments of the disclosure.

Hereinafter, a camera module will be described in detail with reference to the accompanying drawings.

FIG. 1 is an exploded perspective view illustrating a camera module according to an exemplary embodiment of the present disclosure.

The camera module is coupled to a device mounted with a camera, and includes a fixture securely supported to the device and a moving part moving relative to the fixture for auto focusing and inhibiting trembling.

The moving part (200) takes a cylindrical shape and is centrally fixed with a lens. The lens preferably includes a cylindrical lens unit (210 of FIG. 3) as a type of a barrel, where the lens unit (210) is threaded to an inner surface of the moving part (200). The fixture includes a housing (110) distanced at a predetermined space from the moving part (200), and a base (100) coupled to the housing (110).

The base (100) may be coupled to a porous member (101) serving as a buffer member when the moving part (200) comes nearby to restrain noise and vibration, an IR (Infrared) filter (not shown), an image sensor (not shown) converting light to a digital image and a PCB (104 of FIG. 3, Printed Circuit Board) where a control signal is inputted and outputted.

The moving part (200) is arranged in an inner space of the fixed housing (110) and serves to focus an image to the image sensor by vertically moving relative to the housing (110) and to compensate trembling by horizontally tilting the lens in response to trembling of the camera module. The camera module further includes a driving unit for driving the moving part horizontally and vertically.

The driving unit includes a plurality of magnets and a plurality of coils corresponding to each of the plurality of magnets. The housing (110) and the moving part (200) are arranged with the coils and the magnets for electric interaction with the driving unit.

As an exemplary embodiment for arrangement of the driving unit, the moving part (200) may be arranged at a periphery with the coils, and magnets may be arranged at areas opposite to the coils in the housing. However, the driving unit is arranged with at least three magnets for realizing vertical movement of the moving part (200) for focusing and horizontal tilting for trembling correction, and at least three coils for generating magnetic force by being applied with voltage are individually controlled by a control signal.

In an exemplary embodiment of the present disclosure, the coils, for example, may be arranged at the housing (110) which is a fixture, and the magnets, for example, may be arranged at the moving part (200).

To be more specific, the periphery of the moving part (200) is arranged with at least three magnets and an area opposite to each magnet in the housing (110) is arranged with coils opposite to each magnet.

In an exemplary embodiment of the present disclosure, four coils and four magnets may be arranged, for example, where each coil and each magnet are equidistantly arranged. Thus, as illustrated in FIG. 1, a part of the area at the periphery of the moving part (200) is arranged with a first magnet (211), and the housing (110) opposite to the first magnet (211) is arranged with a first coil (111).

Furthermore, the periphery of the moving part (200) is arranged along a counterclockwise direction based on the first magnet (211) with second, third and fourth magnets (212, 213, 214) respectively. The housing (110) opposite to the second, third and fourth magnets (212, 213, 214) is arranged with second, third and fourth coils (112, 113, 114) respectively.

The housing (110) takes a shape of a vertically opened rectangular box. The first, second, third and fourth coils (111, 112, 113, 114) are symmetrically arranged at each lateral surface of the housing (110), and the first, second, third and fourth coils (111, 112, 113, 114) are arranged opposite to the moving part (200) arranged inside an inner space.

Thus, although the first, second, third and fourth coils (111, 112, 113, 114) may be arranged inside an inner surface of the housing (110), in order to facilitate application of a driving signal to the first, second, third and fourth coils (111, 112, 113, 114), the lateral surface of the housing (110) is formed with a through hole corresponding to the shape of the first, second, third and fourth coils (111, 112, 113, 114), whereby the first, second, third and fourth coils (111, 112, 113, 114) are supported by the housing (110). Furthermore, the housing (110) is preferably formed with an insulating material and manufactured in an injection molded product in consideration of productivity.

Figure 3:
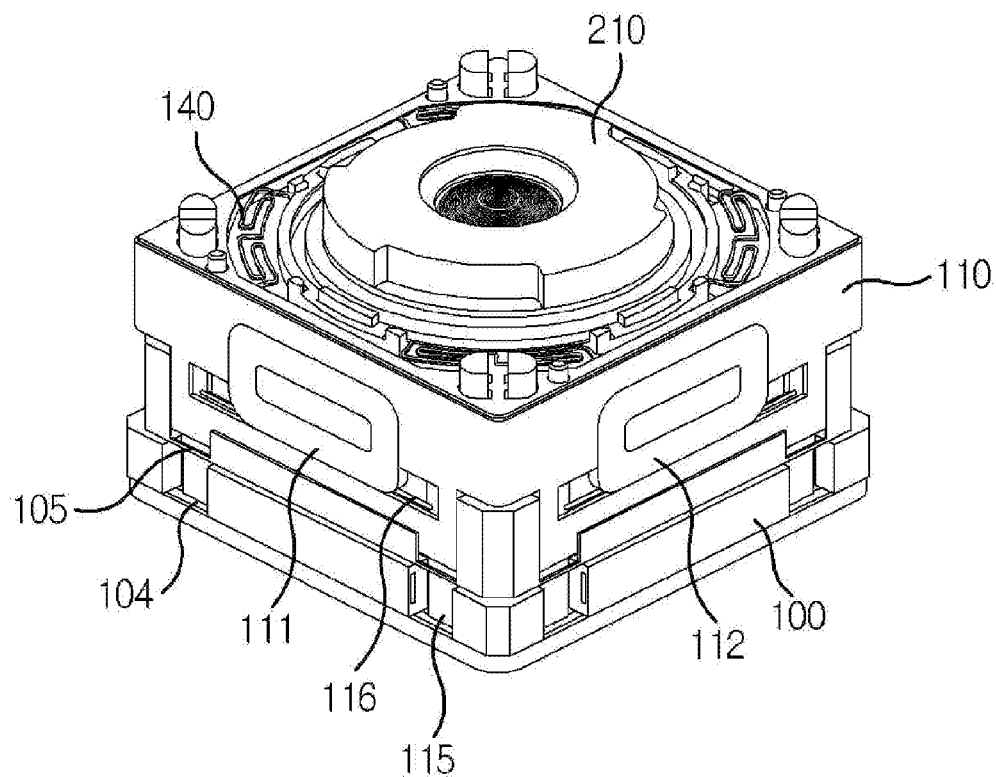
FIG. 3 is a perspective view illustrating a camera module according to an exemplary embodiment of the present disclosure.

The housing (110) is coupled at bottom surface with the base (100), where the base (100) is coupled by a flat PCB (104 of FIG. 3). The PCB (104) is electrically connected to the first, second, third and fourth coils (111, 112, 113, 114) and the PCB (104) inputs a driving signal to the first, second, third and fourth coils (111, 112, 113, 114). The housing (110) is wrapped by an approximately square shield cover (120) forming an exterior surface of the camera module.

The moving part (200) is moved by magnetic force of the first, second, third and fourth magnets (211, 212, 213, 214) from the first, second, third and fourth coils (111, 112, 113, 114), and in order to support the movement of the moving part (200), the moving part (200)*is* coupled with a spring elastically supporting the moving part (200).

The spring is formed with a leaf spring in consideration of spatial advantage and equal elasticity. The spring may be so arranged as to support either an upper side or a bottom side of the moving part (200) but in order to guarantee an operation reliability, the spring is preferably arranged on both the upper side and the bottom side of the moving part (200).

In an exemplary embodiment of the present disclosure, the spring includes an upper spring (140) supporting an upper distal end of the moving part (200), and a bottom spring (130) supporting a bottom distal end of the moving part (200). Although the upper and bottom springs (140, 130) may be separately formed on each area of the housing (110), the upper and bottom springs (140, 130) are preferably formed by cutting and bending a single plate. Thus, each of the upper and bottom springs (140, 130) substantially takes a ring shape, an inner surface of each of the upper and bottom springs (140, 130) substantially takes a circular shape to correspond to the moving part (200), and an outer surface of each of the upper and bottom springs (140, 130) substantially takes an appropriate square shape to be supported to the shape of the housing (110) and the base (100).

The upper spring (140) is arranged on an upper side of the housing (110), and a predetermined area of the upper spring (140) is protruded to an inner circumferential direction from an opening formed at the upper side, and the protruded area supports the upper distal end side of the moving part (200).

Furthermore, an edge of the bottom spring (130) is supported by an upper surface of the base (100), and supports a bottom distal end side of the moving part (200) from the inner circumference.

For an exact arrangement of the upper spring (140), lugs protruding upwards are formed on the upper surface of the base (100) or on the upper distal end of the housing (110), where each of the lugs is insertedly coupled to a hole, a groove or a staircase sill formed on the upper spring (140) or the bottom spring (130).

Figure 2:
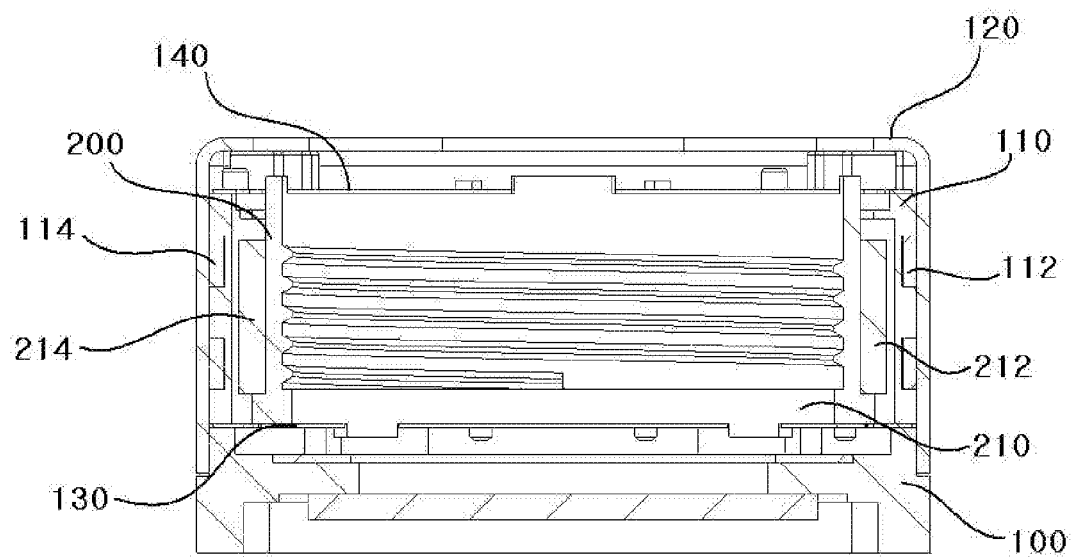
FIG. 2 is a front cut-out view illustrating a camera module according to an exemplary embodiment of the present disclosure.

FIG. 2 is a front cut-out view illustrating a camera module according to an exemplary embodiment of the present disclosure.

Referring to FIG. 2, the moving part (200) is arranged with mutually facing second and fourth magnets (212, 214) and mutually facing first and third magnets (211, 213)

illustrated in FIG. 1, and the upper and bottom distal ends of the moving part (2000 are supported by the upper and bottom springs (140, 130).

An inner surface of the housing (110) arranged in the shape of wrapping the periphery of the moving part (200) is arranged with the first, second, third and fourth coils (111, 112, 113, 114). The first, second, third and fourth coils (111, 112, 113, 114) are arranged opposite to the first, second, third and fourth magnets (211, 212, 213, 214) formed on the periphery of the moving part (200), where each of the first, second, third and fourth magnets (211, 212, 213, 214) preferably takes a shape of an oblong.

Each of the first, second, third and fourth coils (111, 112, 113, 114) takes a shape of a track, and with reference to FIG. 1, each area of vertical width of the first, second, third and fourth coils (111, 112, 113, 114) is arranged to face each of the first, second, third and fourth magnets (211, 212, 213, 214). Furthermore, two strands of tails are extracted from each of the first, second, third and fourth coils (111, 112, 113, 114). The tails are electrically connected to the PCB arranged at the bottom of the base (100), whereby a driving signal is applied to the first, second, third and fourth coils (111, 112, 113, 114) from the PCB.

Meanwhile, because the upper surface and the bottom surface of the first, second, third and fourth coils (111, 112, 113, 114) are lengthily cross-wisely arranged, each of the first, second, third and fourth magnets (211, 212, 213, 214) opposite to each of the first, second, third and fourth coils (111, 112, 113, 114) is preferably arranged with an opposite polarity at the upper and bottom surfaces in consideration of direction of magnetic force.

Thus, in a case an upper side of a surface facing the first, second, third and fourth magnets (211, 212, 213, 214) is arranged with S polarity, a bottom side may be arranged with N polarity by equally dividing the first, second, third and fourth magnets (211, 212, 213, 214) to a height direction.

The housing (110) is supported by elasticity of the upper spring (130) and the bottom spring (140), and in a case the coil is not applied with voltage, the housing (110), is situated at a base position when self-weight of the moving part (200) and elastic supporting force maintain an equilibrium.

Each central line of the first, second, third and fourth magnets (211, 212, 213, 214) is further downwardly arranged than an axial central line of each of the first, second, third and fourth coils (111, 112, 113, 114) as much as a predetermined height, as illustrated in FIG. 2. For example, in a case a same driving signal is applied to the first, second, third and fourth coils (111, 112, 113, 114), the first, second, third and fourth magnets (211, 212, 213, 214) receive a soaring force by the magnetic force, and an entire moving part (200) including a lens is in a position of matching a focus of an image.

However, although each central line of the first, second, third and fourth magnets (211, 212, 213, 214) is further downwardly arranged than an axial central line of each of the first, second, third and fourth coils (111, 112, 113, 114) as much as a predetermined height in an exemplary embodiment of the present disclosure, it should be apparent that each central line of the first, second, third and fourth magnets (211, 212, 213, 214) is further upwardly arranged than an axial central line of each of the first, second, third and fourth coils (111, 112, 113, 114) as much as a predetermined height.

The present disclosure can provide a concept of focusing and compensation of trembling caused by tilting through individual receipt of driving signal by the first, second, third and fourth coils (111, 112, 113, 114) and control of generated magnetic force using only the first, second, third and fourth coils (111, 112, 113, 114). Therefore, the moving part (200) may move upwards, downwards and tilt with an inclination relative to a central axis of the lens. Explanation regarding the tilting control will be further described with reference to FIGS. 4 and 5.

In an exemplary embodiment of the present disclosure, the moving part (200) can tilt at the base position, such that the bottom distal end side of the moving part (200) is preferably offset from the base at a predetermined space.

That is, in a case the moving part (200) is tilted relative to the central axis of the lens by applying a driving signal to each of the first, second, third and fourth coils (111, 112, 113, 114), a predetermined area at the bottom distal end side of the moving part (200) ascends, and an area corresponding thereto descends to require a spatial margin further downwardly than the base position. Therefore, a tiltable space is formed between the bottom distal end of the moving part (200) and the base (100).

FIG. 3 is a perspective view illustrating a camera module according to an exemplary embodiment of the present disclosure. FIG. 3 illustrates that a lens unit (210) is further arranged and the shield cover (120) is omitted.

Due to the fact that the first, second, third and fourth coils (111, 112, 113, 114) individually receive a driving signal, the tails of the first, second, third and fourth coils (111, 112, 113, 114) for receiving the driving signal are connected to the PCB (104) respectively. Thus, in a case the first, second, third and fourth coils (111, 112, 113, 114) are arranged at the moving part (200), there may be a problem of interference of tails resultant from movement of the moving part (200), and a difficulty in soldering in the assembly process, and it should be noted that there is an advantage of the first, second, third and fourth coils (111, 112, 113, 114) being arranged at the housing (110).

Each of the tails at the first, second, third and fourth coils (111, 112, 113, 114) is extracted to both sides from bottom side of the track-shaped first, second, third and fourth coils (111, 112, 113, 114). Preferably, the tails are arranged at the periphery side of the housing (110), and more preferably, the housing (110) includes a connector (116) which is a space in which a terminal is soldered along with the arrangement of the tails. The connector (116) may be further formed with a terminal unit (115) extended to the PCB (104).

Referring to FIG. 1 again, the terminal unit (115) is a conductive material extended to the PCB (104) arranged at the bottom surface of the base (100) by penetrating the base (100). An upper distal end of the terminal unit (115) is partially exposed to be connected to the tail of the coil at left/right spaces of the connector (116), and a bottom distal end is connected to the PCB (104).

An area penetrated by the terminal unit (115) of the base (100) may be grooved, or may be formed with a hole-shaped terminal insertion hole (105) as illustrated in FIG. 1.

In a case at least three, preferably four sets of first, second, third and fourth coils (111, 112, 113, 114) are arranged at the housing (110), two terminal units are electrically connected to each surface of any one of the first, second, third and fourth coils (111, 112, 113, 114), such that a total of eight terminal units (115) and four connectors (116) are resultantly formed on the housing (110).

The terminal unit (115) may be inserted to the housing (110) after the housing (110) is manufactured, or may be formed by an insert injection molding method if the housing (110) is to be formed by injection molding process.

In a case the housing (110) is formed with the terminal units (115) and the connectors (116), a soldering space can be acquired for the terminal units (115) and the connectors (116) to simply connect the coils in the manufacturing process, to enhance the reliability of electrical connection and to remove the interference possibility by the movement of the moving part (200).

Meantime, the upper distal end side of the housing (110) is formed with the upper spring (140) in FIG. 3, a periphery of the upper spring (140) is inserted by the lugs formed at the upper distal end side of the housing (110). Furthermore, an inner side of the upper spring (140) elastically supports the upper distal end side of the moving part (200), and in a case the moving part (200) moves upwards from the base position, the upper spring (140) maintains a balance with the magnetic force by interaction between the coils and the magnets along with the bottom spring (130), whereby an axial moving distance and tilting angle can be determined.

Therefore, although four or two upper springs (140) may be arranged on each side or corner area of the upper distal end side of the housing (110), the upper spring (140) is preferably formed by bending and cutting a single plate in consideration of productivity.

However, in view of the fact that each movement of the moving part (200) is controlled at areas where the coils are arranged according to the concept of the present disclosure, the upper spring (140) must independently provide elasticity from cross-wise direction and length-wise direction, and must be formed in an appropriate shape to provide a mutually equal and linear elasticity.

Furthermore, the bottom spring (130) is supported by the bottom side of the housing (110) and the upper side of the base (100), and the inner side providing the elasticity is preferred to take a same shape as that of the upper spring (140).

Now, control process of the moving part for tilting and focusing according to the present disclosure will be described with reference to FIGS. 4 and 5.

Figure 4:
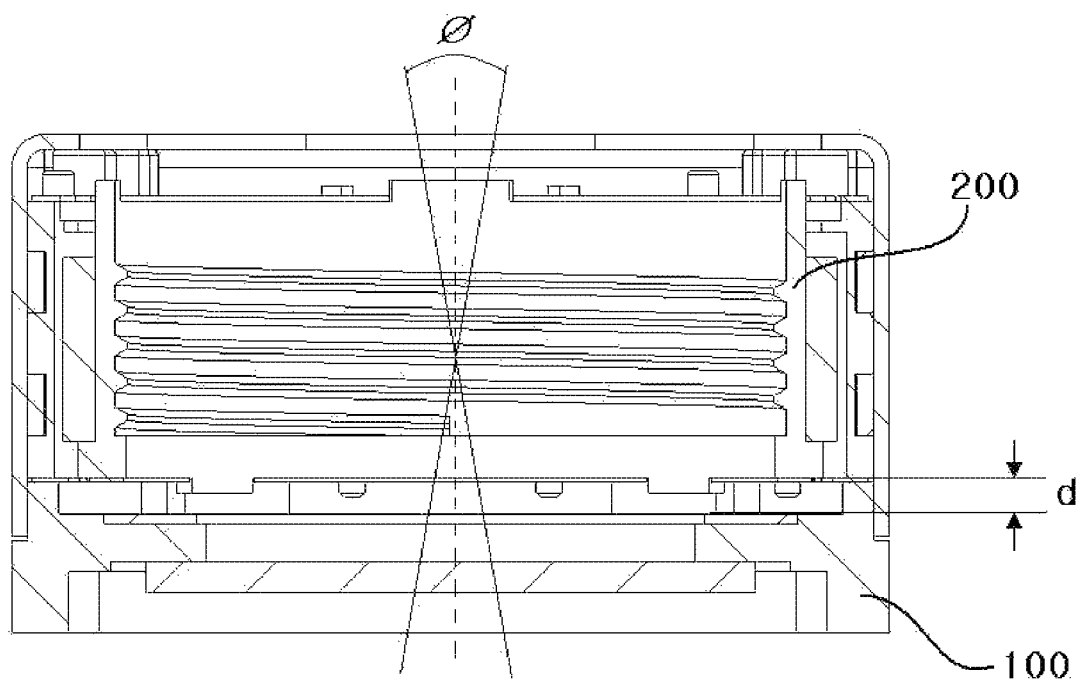
FIG. 4 is a front cut-out view illustrating a tilting angle of a moving part at a camera module according to an exemplary embodiment of the present disclosure.
Figure 5:
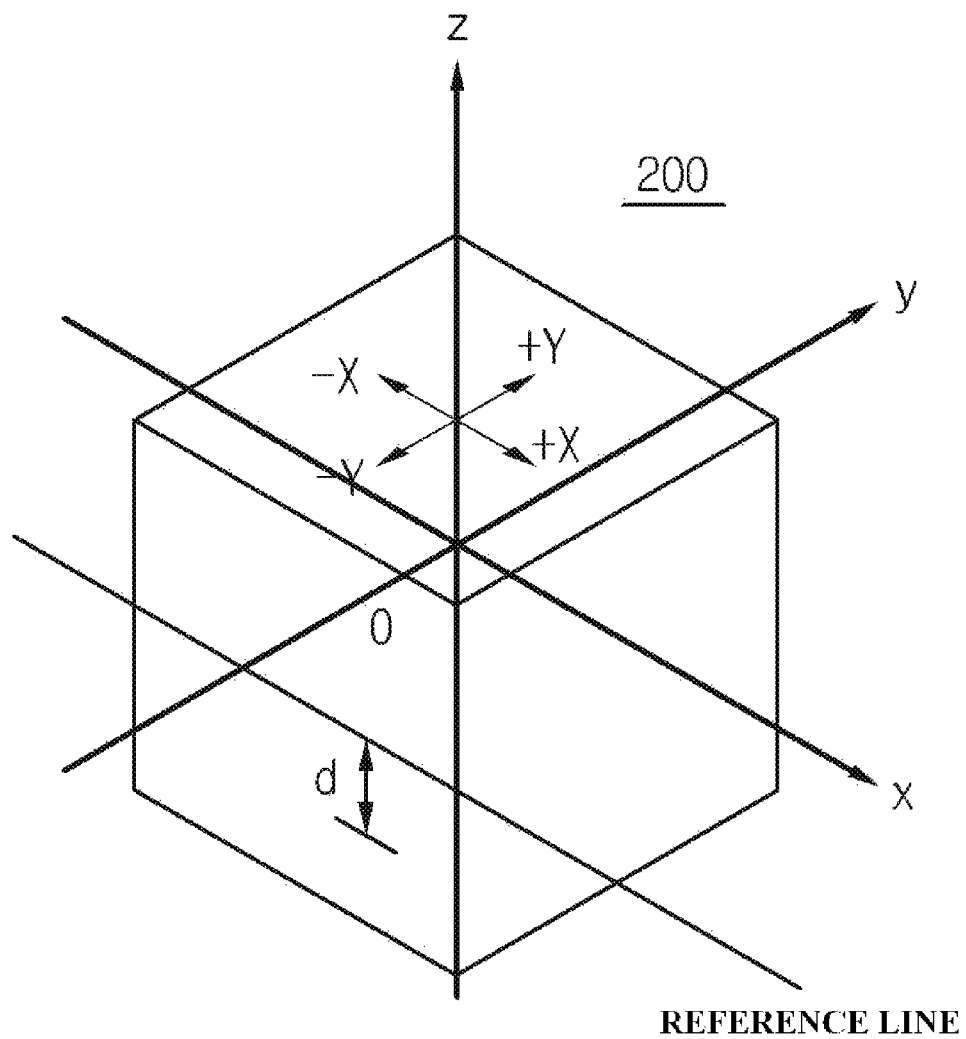
FIG. 5 is a conceptual view illustrating a 3-D movement of a moving part at a camera module according to an exemplary embodiment of the present disclosure.

FIG. 4 is a front cut-out view illustrating a tilting angle of a moving part at a camera module according to an exemplary embodiment of the present disclosure, and FIG. 5 is a conceptual view illustrating a 3-D movement of a moving part at a camera module according to an exemplary embodiment of the present disclosure.

Hereinafter, a direction of the third magnet (213) from the first magnet (211) is defined as y axis, and a direction of second magnet (212) from the fourth magnet (214) is defined as x axis, and a central axis extended to an upper surface from a bottom surface of the moving part (200) is defined as z axis. Furthermore, a center where the tilting is performed is defined as starting points of the axes. Although the starting point means an approximate height direction center of the moving part (200), it should be noted that the starting point can be variably set up from axial direction in consideration of equilibrium of force applied to the moving part (200).

FIG. 4 suggests a concept of tilting by the moving part (200) to the x axis. For example, in a case a voltage is applied only to the second coil (112) opposite to the second magnet (212), the moving part (200) receives a force of +X direction, where X defines a predetermined displacement to x axis direction, and Y and Z respectively define displacement to y axis and z axis. To be more specific, in a case a voltage is applied to the second magnet (212), the upper distal end of the moving part (200) receives a force to the +X direction, while the bottom distal end receives a force to −X direction in response thereto, whereby the tilting can be realized.

Therefore, the moving part (200) can be horizontally tilted relative to the central axis by individually controlling the first, second, third and fourth coils (111, 112, 113, 114), whereby a control signal is applied based on trembling detected by using trembling detection means such as a gyro sensor to tilt the moving part (200), whereby the trembling can be offset or compensated.

A maximum tilting angle ($\phi$) for compensating the trembling is realized at approximately 1 degree based on Z axis. Generally, a maximum trembling angle by hand shake may be approximately 1.2 degrees.

Now, a control process of axially moving the moving part (200) for focusing will be described.

In a case a same driving signal is applied to the first, second, third and fourth coils (111, 112, 113, 114), the moving part (200) ascends to z axis direction to enable a focusing between the image sensor and the lens. Furthermore, in a case a same driving signal is applied to a pair of coils (114, 112) arranged to x axis, or a pair of first and third coils (111, 113) arranged to y axis, the moving part (200) likewise may be moved to z axis direction.

A maximum distance for focusing of a camera module used for mobile device may be set at an approximately 20 μm.

Meanwhile, the term of indicated in FIG. 5 defines a discrete distance between the upper surface of the base (100) and the base position.

Now, a control process for trembling compensation and focusing thus mentioned will be described with reference to the following table, where Coil 1 means the first coil (111), and coils 2, 3 and 4 respectively mean the second, third and fourth coils (112, 113, 114). Furthermore, it should be noted that, although variables indicated as 0 and 1 are shown as ON and OFF of applied control signal, the variables must be, to be more exact, understood as a difference of input voltage of the applied control signal, and strength of the control signal may be variably set up in order to control a degree of tilting angle or an axial moving distance.

TABLE 1

| Coil1 | Coil2 | Coil3 | Coil4 | Output of moving part | |
|---|---|---|---|---|---|
| 0 | 0 | 0 | 0 | 0 | Base position |
| 1 | 0 | 0 | 0 | −Y | |
| 1 | 1 | 0 | 0 | −Y, +X | |
| 1 | 0 | 1 | 0 | −Y, +Y | z axis focusing |
| 1 | 0 | 0 | 1 | −Y, −X | |
| 1 | 1 | 1 | 0 | −Y, +X, +Y | |
| 1 | 1 | 0 | 1 | −Y, +X, −X | |
| 1 | 0 | 1 | 1 | −Y, +Y, −X | |
| 1 | 1 | 1 | 1 | −Y, +X, +Y, −X | z axis focusing |
| 0 | 1 | 0 | 0 | +X | |
| 0 | 0 | 1 | 0 | +Y | |
| 0 | 0 | 0 | 1 | −X | |
| 0 | 1 | 1 | 0 | +X, +Y | |
| 0 | 1 | 0 | 1 | +X, −X | z axis focusing |
| 0 | 0 | 1 | 1 | +Y, −X | |
| 0 | 1 | 1 | 1 | +X, +Y, −X | |

As shown in TABLE 1, the tilting movement for movement to z axis direction for focusing and trembling compensation can be controlled by controlling the voltage applied to the first, second, third and fourth coils (111, 112, 113, 114).

Furthermore, the tilting and focusing can be simultaneously controlled. For example, if an output of the moving part is realized by −Y, +X, −X as shown in the TABLE, it should be also noted that movement is made to the z axis direction, and simultaneously tilting can be realized to −Y direction.

As apparent from the foregoing, the camera module according to the concept of the present disclosure is advantageous in that structure is simple, and auto focusing and trembling compensation can be effectively realized, because the moving part can be operated by an operation unit configured with tilting and height direction movement in one set. At this time, the lens is preferably formed with a material and a shape having a broader optical performance than that of a sensor.

The previous description of the present disclosure is provided to enable any person skilled in the art to make or use the invention. Various modifications to the invention will be readily apparent to those skilled in the art, and the generic principles defined herein may be applied to other variations without departing from the spirit or scope of the invention. Thus, the present disclosure is not intended to limit the examples described herein, but is to be accorded the widest scope consistent with the principles and novel features disclosed herein.

What is claimed is:

1. A camera module having a mechanical image stabilization mechanism, comprising:
   a printed circuit board;
   an image sensor coupled to the printed circuit board;
   a base disposed over the printed circuit board and the image sensor,
   a cover coupled to the base;
   a mover disposed inside the cover and including a magnet, wherein the magnet includes a first magnet, a second magnet, a third magnet disposed opposite to the first magnet, and a fourth magnet disposed opposite to the second magnet, fixed to the mover;
   a coil including a first coil, a second coil, a third coil disposed opposite to the first coil, and a fourth coil disposed opposite to the second coil, and
   wherein the first coil, the second coil, the third coil, and the fourth coil are disposed facing the first magnet, the second magnet, the third magnet, and the fourth magnet, respectively;
   an elastic member supporting the mover; and
   a terminal including a first terminal, a second terminal, a third terminal, and a fourth terminal, electrically connecting the printed circuit board to the first coil, the second coil, the third coil, and the fourth coil, respectively;
   wherein the mover is stationary at an initial position when no current is applied to the coil and a gap is present between a bottom surface of the mover and an upper surface of the base;
   wherein the first coil is electrically connected to the first terminal, the second coil is electrically connected to the second terminal, the third coil is electrically connected to the third terminal, and the fourth coil is electrically connected to the fourth terminal;
   wherein the terminal is disposed on the base, configured to electrically connecting the coil and the printed circuit board; and
   wherein a first signal is applied to the first coil and the third coil, and a second signal is applied to the second coil and the fourth coil.

2. The camera module of claim 1, wherein when current is applied to the coil, the coil and the image sensor are fixed and the magnet is moving such that the magnet is configured to move relative to the coil and the image sensor.

3. The camera module of claim 1, wherein the coil takes a shape of a track.

4. The camera module of claim 1, wherein the magnet and the coil are disposed within the camera module to perform an optical image stabilization function, such that when the camera module performs the optical image stabilization function, the image sensor is stationary relative to the coil.

5. The camera module of claim 1, wherein the cover includes an upper plate and four lateral plates extending from the upper plate, and the magnet is disposed in parallel to each of the four lateral plates.

6. The camera module of claim 1, wherein the first signal is the same as the second signal.

7. The camera module of claim 1, wherein the first signal is greater or smaller than the second signal.

8. A camera module, comprising:
   a printed circuit board:
   an image sensor coupled to the printed circuit board;
   a lens disposed above the image sensor;
   a housing including a base disposed over the printed circuit board, a cover, coupled to the base, and a coil disposed on the housing, wherein the coil includes a first coil, a second coil, a third coil disposed opposite to the first coil, and a fourth coil disposed opposite to the second coil, and wherein the printed circuit board is coupled to the housing;
   a mover disposed inside the housing and including a bobbin coupled to the lens and a magnet fixed to the mover, wherein the magnet includes a first magnet, a second magnet, a third magnet disposed opposite to the first magnet, and a fourth magnet disposed opposite to the second magnet;
   an elastic member supporting the mover between the housing and the mover; and
   a terminal disposed on the base and electrically connecting the coil to the printed circuit board, wherein the terminal includes a first terminal, a second terminal, a third terminal, and a fourth terminal;
   wherein the mover is stationary at an initial position when no current is applied to the coil and a gap is present between a bottom surface of the mover and an upper surface of the base,
   wherein the first coil, the second coil, the third coil, and the fourth coil are disposed facing the first magnet, the second magnet, the third magnet, and the fourth magnet, respectively;
   wherein the first coil is electrically connected to the first terminal, the second coil is electrically connected to the second terminal, the third coil is electrically connected to the third terminal, and the fourth coil is electrically connected to the fourth terminal;
   wherein the first coil and the third coil are one set of coils, and the second coil and the fourth coil are another set of coils; and
   wherein the one set of coils and the another set of coils are configured to be separately controlled by same or different control signals from the printed circuit board via the terminal.

9. The camera module of claim 8, wherein the control signals include a first signal applied to the one set of coils and a second signal applied to the another set of coils.

10. The camera module of claim 8, wherein the magnet and the coil are disposed within the camera module to perform an optical image stabilization function, such that when the camera module performs the optical image stabilization function, the image sensor is stationary relative to the coil.

11. The camera module of claim 8, wherein when current is applied to the coil, the coil and the image sensor are fixed and the magnet is moving such that the magnet is configured to move relative to the coil and the image sensor.

12. The camera module of claim 8, wherein two ends of the coil are electrically connected with the PCB via the terminal.

13. The camera module of claim 1, further comprising a trembling detection means configured to detect a trembling of the camera module.

14. The camera module of claim 13, wherein the trembling detection means includes a gyro sensor.

15. A mobile phone comprising the camera module of claim 14, wherein when the mover moves, and a control signal is applied to the coil based on the trembling detected by the trembling detection means, such that the trembling is offset or compensated.

16. A mobile phone comprising the camera module of claim 15, wherein the control signal is configured to tilt the mover.

17. The camera module of claim 1, wherein the terminal is disposed in a groove portion formed at a lateral surface of the base and extends toward the printed circuit board configured to be connected with the printed circuit board.

18. A lens driving apparatus comprising:
a housing including a base, a cover coupled to the base, and a coil disposed on the housing, wherein the coil includes a first coil, a second coil, a third coil disposed opposite to the first coil, and a fourth coil disposed opposite to the second coil;
a mover disposed inside the housing and including a bobbin coupled to a lens and a magnet fixed to the mover, wherein the magnet includes a first magnet, a second magnet, a third magnet disposed opposite to the first magnet, and a fourth magnet disposed opposite to the second magnet;
an elastic member supporting the mover between the housing and the mover; and
a terminal disposed on the base and electrically connecting the coil to a printed circuit board, wherein the terminal includes a first terminal, a second terminal, a third terminal, and a fourth terminal;
wherein the mover is stationary at an initial position when no current is applied to the coil and a gap is present between a bottom surface of the mover and an upper surface of the base,
wherein the first coil, the second coil, the third coil, and the fourth coil are disposed facing the first magnet, the second magnet, the third magnet, and the fourth magnet, respectively;
wherein the first coil is electrically connected to the first terminal, the second coil is electrically connected to the second terminal, the third coil is electrically connected to the third terminal, and the fourth coil is electrically connected to the fourth terminal;
wherein a first signal is applied to the first coil and the third coil, and a second signal is applied to the second coil and the fourth coil; and
wherein when current is applied to the coil, the coil is fixed and the magnet is moving such that the magnet is configured to move relative to the coil.

19. The lens driving apparatus of claim 18, wherein the printed circuit board (PCB) is configured to provide a power to the coil.

20. The lens driving apparatus of claim 18, wherein the first signal is greater or smaller than the second signal.

* * * * *